(No Model.)
L. ROTHGERY.
SAW.
No. 452,391. Patented May 19, 1891.
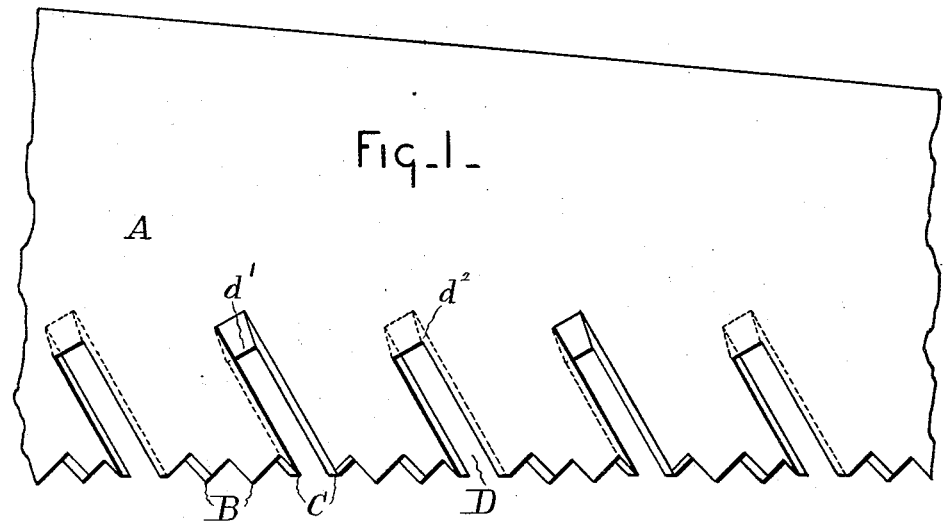
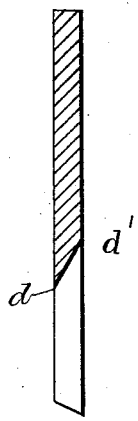 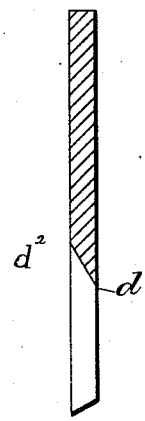
WITNESSES
C. J. Shipley
L. A. Doeltz
INVENTOR
Leopold Rothgery.
By Wells W. Leggett & Co.
Attorneys.

UNITED STATES PATENT OFFICE.

LEOPOLD ROTHGERY, OF DETROIT, MICHIGAN.

SAW.

SPECIFICATION forming part of Letters Patent No. 452,391, dated May 19, 1891.

Application filed May 11, 1889. Serial No. 310,429. (No model.)

*To all whom it may concern:*

Be it known that I, LEOPOLD ROTHGERY, a citizen of the United States, residing at Detroit, county of Wayne, State of Michigan, have invented a certain new and useful Improvement in Saws; and I declare the following to be a full, clear, and exact description of the invention, such as will enable others skilled in the art to which it pertains to make and use the same, reference being had to the accompanying drawings, which form a part of this specification.

In the use of saws, either crosscut or rippers, great difficulty is experienced from the fact that the teeth will not make a perfectly smooth cut, but will cut an irregular surface, and after the saw has buried itself in the kerf the irregular surfaces binding on the faces of the saw greatly increase the labor of sawing.

To provide a saw which shall plane the sides of the kerf as the saw buries itself is the object of my invention.

In the drawings, Figure 1 is a side elevation of a section of my saw. Figs. 2 and 3 represent cross-sections of the same.

In carrying out my invention, A represents the blade of the saw.

B are the cutting-teeth, and C the clearing-teeth, preferably made slightly shorter than the cutting-teeth.

D is a clearing space or throat.

The cutting and clearing teeth may be any shape desired, and there may be any desired number between the clearance-spaces; but I prefer to arrange them, as shown, with two cutting-teeth inclined and beveled in opposite directions between two clearing-teeth and a clearing-space between the clearing-teeth. The side edges $d$ of these clearing-spaces are preferably beveled in alternated directions, as shown in Figs. 2 and 3, so as to plane the sides of the kerf to a certain extent. The bottom edges $d'$ $d^2$ are also beveled on alternate sides. As, for instance, the edge $d'$ is beveled on one side, while the edge $d^2$ is beveled in the opposite direction, and these edges $d$ constitute planing-edges, which are straight between the sides of the clearing-spaces D and run in lines oblique to a right line taken longitudinally through the saw-blade. These throats having the bottom cutting-edges will thus act as a plane, and will not only clear the sawdust, &c., from the kerf, but will plane the sides perfectly, so that they will not bind the sides of the saw.

I am aware that saws have heretofore been made with clearing-throats, and I am also aware that the side edges of these throats have been beveled or sharpened, and such I do not claim.

What I claim is—

A saw-blade provided alternately with two cutting-teeth inclined and beveled in opposite directions and two clearing-teeth with a clearing-space between them, such clearing-spaces inclining to the cutting-edge of the blade, extending into the blade beyond the cutting-teeth, having their opposite edges beveled in opposite directions and having their bottoms inclined to the cutting-edge of the blade and alternately beveled in opposite directions, substantially as described.

In testimony whereof I sign this specification in the presence of two witnesses.

LEOPOLD ROTHGERY.

Witnesses:
  W. H. CHAMBERLIN,
  L. A. DOELTZ.